United States Patent [19]

Fujita et al.

[11] Patent Number: 4,552,915

[45] Date of Patent: Nov. 12, 1985

[54] LOW-TEMPERATURE SINTERED PORCELAIN COMPOSITION SUITABLE FOR FORMING

[75] Inventors: Toshio Fujita; Kazuhiro Watanabe, both of Ohbu, Japan

[73] Assignee: Nippon Kouatsu Electric Co., Japan

[21] Appl. No.: 593,868

[22] Filed: Mar. 27, 1984

[30] Foreign Application Priority Data

Apr. 4, 1983 [JP] Japan .................................. 58-58988

[51] Int. Cl.$^4$ .......................... C08K 3/40; C08K 5/09; C04B 33/24; C04B 35/81
[52] U.S. Cl. .................................... 524/322; 501/142; 523/170; 524/277; 524/445; 524/503
[58] Field of Search ............... 524/445, 503, 277, 322; 523/170; 501/142

[56] References Cited

U.S. PATENT DOCUMENTS 4,160,673  7/1979  Fujita et al. .......................... 501/142

FOREIGN PATENT DOCUMENTS 57-67075  4/1982  Japan .
176167  10/1983  Japan .

Primary Examiner—Herbert J. Lilling
Attorney, Agent, or Firm—Jacobs & Jacobs

[57] ABSTRACT

A low-temperature sintered porcelain composition suitable for forming in which at least one of polystyrene, polyethylene and polypropylene, butyral resin, lubricant and, if required, a plasticizer are mixed in respective predetermined amounts with a mixture consisting of a vitreous composition, aluminum oxide, clay component and a binder, and a low-temperature sintered porcelain composition which further contains an acrylic resin in addition to the above components.

6 Claims, 2 Drawing Figures

LOW-TEMPERATURE SINTERED PORCELAIN COMPOSITION SUITABLE FOR FORMING

BACKGROUND OF THE INVENTION

The present invention relates to a low-temperature sintered porcelain composition which is suitable for forming (particularly, injection molding), and which enables the resin removal process after forming of the primary molded product to be carried out under favorable condition.

Generally, well known plastics such as phenol resin, polyester resin and urea resin are superior in various characteristics including formability, chemical resistance, electrical characteristics, etc.

However, these plastics also have such shortcomings as being easy to burn and producing a large amount of toxic gas or smoke when burnt.

On the other hand, conventional known ceramics and vitreous compositions, which are fabricated through sintering, melting and forming for a longer period of time under a high temperature of more than 1000° C., have such shortcomings as requiring high-temperature treatment and hence consuming a large amount of fuel.

Moreover, low-temperature sintered porcelains and low-melting point inorganic compositions have also been researched and developed in recent years.

These products are, however, inevitably subjected to the process of heating and forming, for example, utilizing the calcined materials or sintering after reaction by heating, and have not so far come into wide use because of the intricate process required.

In view of the above, the applicant of this patent application did research on a low-temperature sintered porcelain which uses a composition consisting of a vitreous component, aluminum oxide, clay component, binder and a coloring agent, and the manufacturing method thereof. Two patent applications were filed as a result of such research (see Japanese Patent Public Disclosure Nos. 54-53118 and 57-67075).

But, it was practically impossible or very difficult for the above low-temperature sintered porcelain composition to be directly subjected to injection molding or the like due to its specific plasticity and fluidity.

For this reason, there has been proposed still another method as follows. Organic material including a thermoplastic resin such as polystyrene or atactic polypropylene (APP), lubricant, plasticizer, etc., which are usually employed in injection molding of ceramics, are mixed and kneaded with powder of the above low-temperature sintered porcelain composition to make a pellet-like or powdered forming material. This material is then injected into a mold of the forming machine, in a similar way to injection molding of plastics, thereby to fabricate a molded product (primary molded product). Finally, the foregoing organic materials are decomposed and volatilized in a resin removing furnace to carry out the main sintering, so that there can be obtained a complete molded product. (See Japanese Patent Publication Nos. 36-7883 and 51-29170)

However, the above method has another shortcoming. Namely, polystyrene contained in the powdered forming material is a resin suitable for imparting the proper formability, but it causes pyrolysis at a brush in the resin removing process under high temperature, e.g., about 290° C. to 330° C. As a result, there will be caused swells, cracks, etc. after the main sintering, and this makes it impossible to obtain a good final product.

SUMMARY OF THE INVENTION

It is therefore an object of the present invention to provide a novel low-temperature sintered porcelain composition which permits reduction of the resin removing time, and which can prevent occurrence of cracks, swells, deformations and the like.

More specifically, in order that the organic materials (particularly, polystyrene) contained in the primary molded product will not be abruptly decomposed by heating in the process of resin removal, a butyral resin is employed in addition to polystyrene in such a mixture ratio that butyral first starts its pyrolysis at about 170° C. and then polystyrene starts to continuously stepwisely decompose after most of the butyral has been decomposed and removed.

That is, according to one aspect of the present invention there is provided a composition suitable for forming a low-temperature sintered porcelain, which comprises:

(a) at least one thermoplastic resin selected from polystyrene, polyethylene and polypropylene . . . ca. 6–20 wt. parts;
(b) butyral resin . . . ca. 1–11 wt. parts;
(c) lubricant . . . ca. 1–6 wt. parts;
and if required,
(e) plasticizer . . . ca. 1–6 wt. parts;
mixed with 100 wt. parts of a mixture (I) having the following composition:
(f) vitreous component . . . ca. 40–60 wt. %;
(g) aluminum oxide . . . ca. 10–30 wt. %;
(h) clay component . . . ca. 10–25 wt. %; and
(i) binder . . . ca. 5–15 wt. %.

As for a porcelain composition which is formed by mixing an organic binder with an inorganic material (ceramics), the optimum resin removing (defatting) of a molded product after the primary forming effected by a forming machine (e.g., injection molding machine) is generally assumed as such that, when the added (or mixed) organic binder is analyzed by means of a thermobalance, the inclination of a pyrolysis line (weight reduction rate/temperature) gives the ratio of approximately ⅓ as indicated by a straight line (a) in FIG. 1.

In this respect, it is found that the porcelain composition according to the above mentioned aspect of this invention has a pyrolysis curve of the organic binder contained therein, which deviated considerably from the foregoing ideal straight line (a) as indicated by a curve (b) in FIG. 1. This means that smooth removal of resin is not relatively attainable and the period of time necessary for resin removal is apt to be prolonged, and that further reduction of the resin removal time tends to cause cracks, swells, deformations, etc.

It is therefore another object of the present invention to provide a novel composition for forming low-temperature sintered porcelain which permits still further reduction of the resin removal time, and which is more effective in preventing occurrence of cracks, swells, deformations, etc.

The above object is achieved by using an organic binder which has a pyrolysis curve which very closely approximates the foregoing ideal straight line of pyrolysis, i.e., by using a particular organic binder with which is mixed an acrylic resin having a relatively low pyrolysis temperature in a proper mixture ratio.

That is, according to another aspect of the present invention there can be provided a composition suitable for forming a low-temperature sintered porcelain, which comprises:
(a) at least one thermoplastic resin selected from polystyrene, polyethylene and polypropylene ... ca. 3-15 wt. parts;
(b) butyral resin ... ca. 1-8 wt. parts;
(c) lubricant ... ca. 1-6 wt. parts;
(d) acrylic resin ... ca. 1-8 wt. parts; and
(e) plasticizer ... ca. 1-5 wt. parts;
mixed with 100 wt. parts of a mixture (I) having the following compositions:
(f) vitreous component ... ca. 40-60 wt. %;
(g) aluminum oxide ... ca. 10-30 wt. %;
(h) clay component ... ca. 10-25 wt. %; and
(i) binder ... ca. 5-15 wt. %.

DETAILED DESCRIPTION OF THE INVENTION

Figure 1:
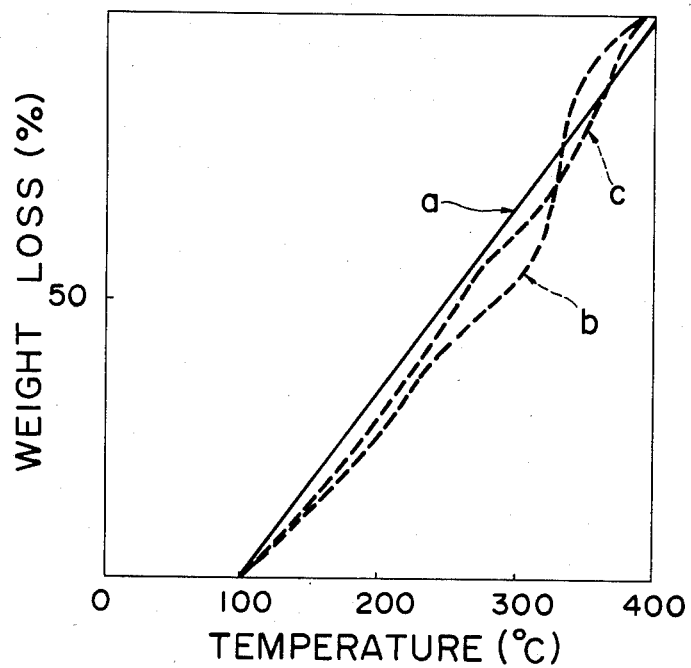
FIG. 1 is a chart showing a pyrolysis curve of the organic binder (without using an acrylic resin) contained in the low-temperature sintered porcelain composition of this invention (indicated at b in the figure), a pyrolysis curve of the organic binder (including an acrylic resin) contained in the composition of this invention (indicated at e in the figure), and the ideal straight line of pyrolysis (indicated at a in the figure), respectively, with the rate of temperature increase being set at 0.5° C./min.

One aspect of the present invention is related to a composition for forming a low-temperature sintered porcelain, which comprises:
(a) at least one thermoplastic resin selected from polystyrene, polyethylene and polypropylene ... ca. 6-20 wt. parts;
(b) butyral resin ... ca. 1-11 wt. parts;
(c) lubricant ... ca. 1-6 wt. parts;
and, if required,
(e) plasticizer ... ca. 1-6 wt. parts;
mixed with 100 wt. parts of a mixture (I) having the following composition:
(f) vitreous component ... ca. 40-60 wt. %;
(g) aluminum oxide ... ca. 10-30 wt. %;
(h) clay component ... ca. 10-25 wt. %; and
(i) binder ... ca. 5-15 wt. %.

Another aspect of the present invention is related to a composition suitable for forming a low-temperature sintered porcelain, which comprises:
(a) at least one thermoplastic resin selected from polystyrene, polyethylene and polypropylene ... ca. 3-15 wt. parts;
(b) butyral resin ... ca. 1-8 wt. parts;
(c) lubricant ... ca. 1-6 wt. parts;
(d) acrylic resin ... ca. 1-8 wt. parts; and
(e) plasticizer ... ca. 1-5 wt. parts;
mixed with 100 wt. parts of the aforesaid mixture (I).

The vitreous component (f) used in the present invention may be of glass cullet, namely, pulverized waste glass arising as a useless by-product of glass ware manufacture from broken glass pieces or glass trimmings. The vitreous component should be used in the percentage of about 40 to 60 wt. % in the mixture (I).

If the vitreous component is less than about 40 wt. %, the product will not be porcelainized. It is apparent from this fact that the vitreous component functions as a fusing agent. To the contrary, if the vitreous component exceeds about 60 wt. %, there will be caused such a disadvantage that contraction becomes larger at the time of heat curing and the dimensional accuracy is deteriorated.

Next, aluminum oxide (g) used in the present invention may usually be alumina, which is easily available as a commercial product in the form of powder.

The alumina component should be used in the percentage of about 10 to 30 wt. % in the mixture (I). If the alumina component is less than about 10 wt. %, the resultant product will be insufficient in its strength and hence cannot be employed in the various uses intended by the present invention. It is understood from the above that alumina serves as a reinforcing agent (aggregate). To the contrary, if the amount of used alumina exceeds about 30 wt. %, this is unpreferable because the product will not be porcelainized by heat curing.

The clay component (h) is easily available commercially. Usual, high plasticity soil consisting mainly of fine alumina silicate materials (so-called clay minerals) can be used as the clay component. Roughly speaking, as well known, the clay minerals are composed of three-component systems of $Al_2O_3$—$SiO_2$—$H_2O$ and have a tendency to provide porcelains which show higher refractoriness with increasing ratio of $Al_2O_3/SiO_2$. From this reason, the term "clay component" as used concerning the present invention should be understood as a general term for those soils which contain silicate minerals, have an aggregate function and are composed of fine particles with a diameter of less than about 0.01 mm. More specifically, there can be cited kaolin, bentonite, comb clay, gairome clay, hallosite, diaspore, sericite, pyrophylite, quartz, etc. by way of examples.

In the present invention, the clay component should be used in the percentage of about 10 to 25 wt. % in the mixture (I). If the clay component is less than about 10 wt. %, formability will be deteriorated, thus resulting in unpreferable products. To the contrary, if the clay component exceeds about 25 wt. %, sintering will not be effected at low temperatures and it is hence impossible to obtain porcelains under the temperature specified by the present invention.

It is understood from the above that the clay component serves to improve formability as well as dimensional stability.

At any rate, it is desirable that the clay component be mixed with alumina in a proper ratio and that the curing temperature be adjusted appropriately.

Moreover, the present invention uses a binder (i) which is effective to join the various raw components together at the time of sintering or forming.

The binder used in the present invention is preferably a phosphoric acid or phosphate. As phosphoric acid, there can be employed all of the known phosphoric acids such as metaphosphoric acid, pyrophosphoric acid, orthophosphoric acid, triphosphoric acid, tetraphosphoric acid, etc.

These phosphoric acids are usually readily water-soluble, so that they may be used in the form of a solution.

Further, phosphate used in the present invention may include alkali phosphate, alkali earth phosphate and aluminum phosphate.

Sodium phosphate is particularly preferable as an alkali phosphate. Also, magnesium phosphate is preferable as an alkali earth phosphate.

The phosphate further includes various salts of polyphosphoric acids. In particular, sodium tetrapolyphosphate is suitable for use in the present invention.

It is to be noted that the above mentioned various components can be singularly or in the form of a mixture comprising two or more of them.

In the present invention, the binder should be used in the percentage of about 5 to 15 wt. % in the mixture (I). If the binder is present at less than about 5 wt. %, the product will not be porcelainized and the resultant product will have inferior strength. On the other hand, if the amount of binder exceeds about 15 wt. %, this is not favorable because there will be caused baking swells in the resultant product and the water absorption rate will be increased. The mixture consisting of the above components (f) to (i) is mixed in a dry state using a known ball mill or vibrating mill. Although the mixture consisting of above components (f) to (i) constitutes the main part of the various ingredients in the porcelain which is obtained by sintering the components according to this invention (referred to as mixture (I) in the specification for the convenience of explanation), the composition of this invention further includes later-described components (a) to (c) and, if required, (e) in order to improve both the hot fluidity and plasticity of the composition at the time of forming or sintering. It should also be noted that the mixture (I) is adjusted to have a grain size on order of about 1 to 50μ. If the grain size is less than about 1μ, the amount of the added organic binder such as the components (a), (b) and (d) will be increased and the resin removal time is apt to be prolonged. On the other hand, if the grain size exceeds about 50μ, the flow resistance of the powder will be enlarged and hence fluidity will be reduced. It is also possible, if necessary, to improve the appearance and to improve the water resistance by adding a coloring agent to the mixture (I) of this invention.

For example, the following metal oxides may be used as the coloring agent:

Indian red ($Fe_2O_3$) ... red
Chromium oxide ... green
Titanium oxide ... yellowish white
Cobalt oxide ... blue
Iron oxide ($Fe_3O_4$) ... black When used, the coloring agent is added in a percentage not larger than about 5 wt. %, preferably at about 3 wt. %, in the mixture (I).

In the present invention, to impart hot fluidity at the time of injection molding, the component (a), namely, at least one selected out of a group comprising polystyrene, polyethylene and polypropylene, is added to the mixture (I) in the form of powder having the grain size as mentioned above. The amount of the added resin is set at the ratio of about 6-20 wt. parts to the mixture (I) of 100 wt. parts in the first aspect of this invention without including an acrylic resin. On the other hand, the amount of the added component (a) is set at the ratio of about 3-15 wt. parts of the mixture (I) of 100 wt. parts in the second aspect of this invention including an acrylic resin. The above polystyrene has a molecular weight of about 50,000 to 230,000 and may by way of example be such a polystyrene as sold by Asahi Chemical Industrial Co., Ltd. under the tradename "Styron" or as sold by Mitsubishi Monsanto Chemical Co., Ltd. under the tradename "Diarex".

The above polyethylene may be of such a high-density polyethylene as sold by Mitsui Petrochemical Industries, "Hizex" or as sold by Syowa Yuka Co., Ltd. under the tradename "Shorex" or as sold by Sumitomo Chemical Co., Ltd. under the tradename "Sumikasen".

Further, the above polypropylene has a molecular weight of about 29,000 to 120,000 and, in particular, it is preferably formed of atactic polypropylene. For example, such a polypropylene as sold by Mitsui Petrochemical Industries, Ltd. under the tradename "Noblen" may be used.

If the component (a) is less than the lower limit value, hot fluidity will be lost during the process of injection molding and it will not be possible to obtain a uniformly molded product. On the other hand, if the component (a) exceeds the upper limit value, there will rise disadvantages as follows. Removal of resin becomes difficult (hence, the resin removal time is prolonged) and, at the same time, the resin is abruptly decomposed at temperatures of the resin removal process (about 290° to 330° C.), thus causing swells, cracks, etc.

Moreover, the component (b), namely, butyral resin (polyvinylbutyral) is used in the present invention. A butyral resin with a butyralation degree of 58 to 75 mol % is suitable for use therein. For example, there can be employed such a butyral resin as sold by Sekisui Chemical Co., Ltd. under the tradename "S-Lec B" or as sold by Electro Chemical Industry Co., Ltd. under the tradename "Denkabutyral". Such a butyral resin starts its pyrolysis at about 170° C. and most of the resin has been decomposed and removed before the component (a) will start its pyrolysis. In the first aspect of the present invention without use of an acrylic resin, the butyral resin should be used in the ratio of about 1–11 wt. parts to the mixture (I) of 100 wt. parts. On the other hand, in the second aspect of the present invention using an acrylic resin, the butyral resin should be used in the ratio of about 1–8 wt. parts to the mixture (I) of 100 wt. parts.

If the butyral resin is less than the lower limit of the above respective ranges, there will be encountered the disadvantages that the resin removal time is prolonged and swells, cracks, etc. appear on the molded product. To the contrary, if the butyral resin exceeds the upper limit, the product will have a tendency to deform because of too large hot softening degree and to suffer internal defects (swells) during the process of resin removal.

In the present invention, there is further mixed the component (c), namely, lubricant, in consideration of the releasability from the forming machine. Hydrocarbon waxes, such as stearic acid, paraffin wax, spermaceti wax, vegetable wax, etc., may be used as the lubricant. An amount thereof used is set at the ratio about 1–6 wt. parts to the mixture (I) of 100 wt. parts in both aspects of the present invention. If the amount is less than about 1 wt. part, the releasing effect will become small. Differently stated, there cannot be obtained a good molded product. To the contrary, if the lubricant exceeds about 6 wt. parts, the hot softening degree will become too large and this results in deformation of the product during the process of resin removal.

Figure 2:
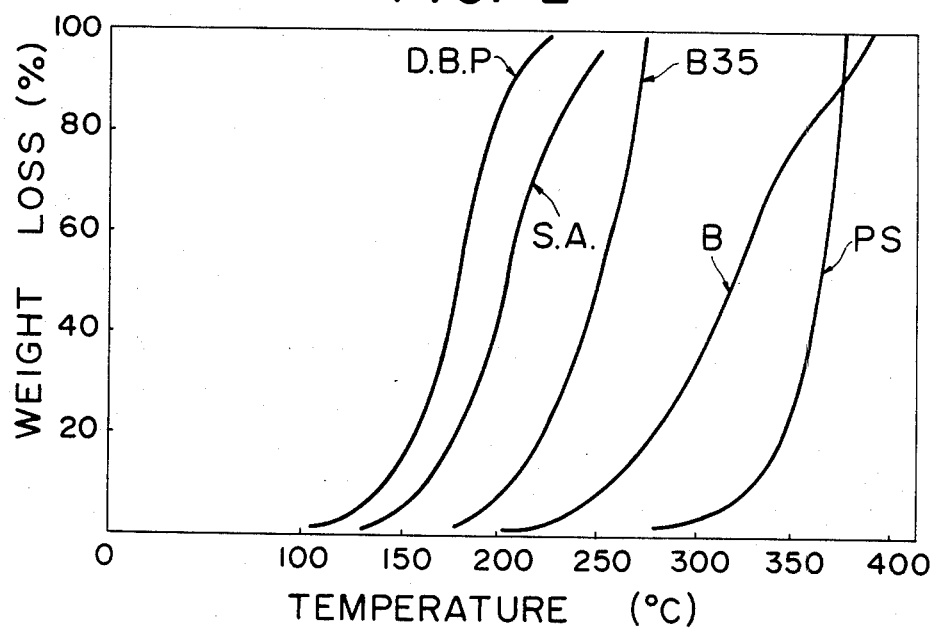
FIG. 2 is a chart showing pyrolysis curves of individual components of the organic binder contained in the low-temperature sintered porcelain composition of this invention with the rate of temperature increase being set at 0.5° C./min, in which D.B.P. denotes dibutylphthalate, S.A. denotes stearic acid, B35 denotes poly-n-butylmethacrylate, B denotes butyral resin and PS denotes polystyrene, respectively.

In the second aspect of the present invention, there is further used the component (d), namely, acrylic resin. As shown in FIG. 2, the acrylic resin has a pyrolysis temperature between that of the lubricant, such as stearic acid, and that of the butyral resin, so that removal of resin can be performed more smoothly by the use of an acrylic resin. More specifically, the butyral resin starts its pyrolysis at about 170° C., and decomposition thereof occurs mainly in the range of 250° to 325° C. (weight reduction of 10 to 65 wt. %). On the other hand, the acrylic resin also starts its pyrolysis at about 170° C., but decomposition thereof occurs mainly in the range of 200° to 250° C. (weight reduction of 10 to 75 wt. %). For reference, FIG. 2 shows pyrolysis curves of the individual components contained in the organic binder of this invention.

The acrylic resin may be formed of poly-methylmethacrylate, poly-ethylmethacrylate, poly-n-butylmethacrylate, poly-iso-butylmethacrylate, poly-methylacrylate, polyethylacrylate, poly-n-butylacrylate, poly-iso-butylacrylate, etc. For example, there can be used commercially available acrylic resins sold under the tradenames "Dianal BR-83". "Dianal BR-88", "Dianal BR-105" and "Dianal BR-107" (all manufactured and sold by Mitsubishi Rayon Company Ltd.), or a test-marketed product B-35 manufactured by Sekisui Chemical Co., Ltd.

In the second aspect of the present invention, the acrylic resin should be used in the ratio of about 1-8 wt. parts to the mixture (I) of 100 wt. parts. If the resin is contained at less than about 1 wt. part, this is unfavorable because the effect of reduction in resin removal cannot be obtained sufficiently and swells, cracks, etc. are apt to occur. To the contrary, if the acrylic resin exceeds about 8 wt. parts, decomposition of a large amount of the resin will lead to the unfavorable result that the rate of temperature increase must be lowered during the process of resin removal and hence the resin removal time is prolonged.

In the first aspect of the present invention, use of the component (e), namely, plasticizer is optional. In the second aspect using an acrylic resin, it is essential to use a plasticizer. The plasticizer is employed for the purpose of imparting plasticity to the both components (a) and (b).

Nearly all commercial plasticizers can be used as the plasticizer for this invention. Since it is required for the plasticizer to have a boiling point which will ensure sufficient evaporation or volatilization, particularly in the process of resin removal, DBP, DOP, DEP, etc. may, by way of example, be preferably used. In the second aspect of the present invention, the amount of the plasticizer used is set at a value sufficient to impart proper plasticity to both components (a) and (b). More specifically, the plasticizer should be used in a ratio of about 1-5 wt. parts to the mixture (I) of 100 parts. If the amount is less than 1 wt. part, softening of both components (a) and (b) will become insufficient and, as a consequence, the effect resulting from addition of both components (a) and (b) will not be developed fully. To the contrary, if the plasticizer exceeds about 5 wt. parts, cool hardening of the molded product will be deteriorated and releasability from the mold will become less. This results in a product that is apt to suffer deformation.

In the first aspect of the present invention without using an acrylic resin, the plasticizer is, if required, used in the ratio of about 1-6 wt. parts to the mixture (I).

As described in the above, the present invention provides a novel composition in which the foregoing individual components are mixed with the mixture (I) in ratios of respective predetermined weight parts to 100 wt. parts thereof.

In this connection, nearly any of the known mixing means can be used for mixing these components.

After sufficient mixing by means of a mixer or the like, the mixture is kneaded using a kneader or the like, if required, under heating at about 150° C., for example, thereby to obtain a low-temperature sintered porcelain composition suitable for forming.

The composition thus obtained may be extruded into the form of a sheet using rolls, cut into a predetermined size after linear extrusion, or made into the pellet-like or powdered form, as desired.

According to the present invention, the composition thus modified is put in an injection molding machine and then injected into a mold under heating at temperatures of 130° to 150° C. so as to produce the primary molded product. The injection conditions are dependent on various factors such as the size of the desired primary molded product. By way of example, the injection conditions are given as follows in the case of a plate-like product having a length of 80 mm, width of 20 mm and thickness of 7 mm:

Injection pressure: 1 t/cm$^2$
Primary injection pressure: 6 seconds
Secondary injection pressure: 4 seconds
Mold temperature: 40° C.
Cooling time: 30 seconds Subsequently, the primary molded product is removed from the mold and then put in a resin removal furnace. The temperature of the furnace is gradually increased from room temperature to about 400° C., thereby removing resin under the increased temperature.

Through the process of resin removing, the components (a) to (e) contained in the composition of this invention are removed in a moderate manner in the order of their boiling points.

Any of various known furnaces can be used as the resin removal furnace for the present invention. In particular, the use of an electric furnace is desired.

The rates of temperature increase are exemplified as follows in case of removing resin in plate-like products having a length of 80 mm, width of 20 mm and thickness of 7 mm and having a length of 80 mm, width of 20 mm and thickness of 5 mm, respectively.

| In Case of Using No Acrylic Resin | | |
|---|---|---|
| Temperature | Rate of Temperature Increase | Time Required |
| Room temperature–150° C. | 20–25° C./hr | 6.5–5.2 hours |
| 150–200 | 3–5 | 16.7–10.0 |
| 200–300 | 7–10 | 14.2–10.0 |
| 300–400 | 10–15 | 10–6.7 |
| | Total | 47.4–31.9 hours |

(where 47.4 hours is for a thickness of 7 mm and 31.9 hours is for a thickness of 5 mm)

| In Case of Using Acrylic Resin | | |
|---|---|---|
| Temperature | Rate of Temperature Increased | Time Required |
| Room temperature– | 65–80° C./hr | 1–0.8 hour |
| 90° C. | | |

-continued

In Case of Using Acrylic Resin

| Temperature | Rate of Temperature Increased | Time Required |
|---|---|---|
| 90–150 | 8.5–10 | 7.1–6.0 |
| 150–220 | 5.5–7.5 | 12.7–9.3 |
| 220–270 | 9.5–11 | 5.3–4.5 |
| 270–400 | 20–30 | 6.5–4.3 |
|  |  | Total 32.6–24.9 |

(where 32.6 hours is for a thickness of 7 mm and 24.9 hours is for a thickness of 5 mm)

Since there is no contribution to removal of resin in the range from room temperature to 90° C., the rate of temperature increase in this range can be determined appropriately.

The above temperature increase rates are shown only as reference values and the invention is not limited to these.

As compared with the prior art which requires several tens to several hundreds of hours for the process of raising temperature and removing resin, the period necessary for resin removal can be greatly shortened by using the composition of the present invention. Particularly, in case of using an acrylic resin, the resin removal time can be made especially short.

Then, the molded product deprived of resin is cooled down to room temperature, if required. It is a matter of course that the hot setting process (main sintering) can be performed without such cooling.

The hot setting means may be composed of an ordinary heating furnace such as a tunnel kiln, shuttle kiln, etc. The hot setting process is generally performed in the range of about 650° to 750° C. The heating time is solely dependent on the heating temperature. As an example, about 30 minutes to 2 hours is required in case of heating at about 700° C.

Since the composition of the present invention can be sintered at low temperatures as will be apparent from the above, it has the favorable features of a small contraction rate during sintering on the order of 12 to 13% (relative to the mold size) and a high dimensional accuracy.

Moreover, the composition of the present invention is suitable for injection molding and hence mass production of complete products.

Hereinafter, the present invention will be described in more detail in conjunction with preferred embodiments. The following Examples will be shown for the purpose of solely explaining the present invention and are not intended to put any limitation on the invention.

EXAMPLE 1

Manufacture of the Mixture (I)

| Glass (cullet) | 42 (wt. %) |
|---|---|
| Aluminum oxide | 23 |
| Clay | 24 |
| Binder (mixture of primary aluminum phosphate and sodium tetrapolyphosphate in ratio of 0.7 to 9.3) | 10 |
| Coloring agent (Indian red) | 3.5 |

The above individual components were fully mixed with one another under agitation, and the mixture (I) was attained.

Manufacture of the Composition of This Invention

The following components were mixed with the above mixture (I) in the respective specific ratios as shown below:

| Mixture (I) | 100 wt. parts |
|---|---|
| Polystyrene resin | 10.8 |
| Butyral resin (butyralation degree of 60 mol %) | 3.6 |
| Stearic acid | 3.6 |
| DBP | 2.4 |

The thus-obtained mixture was then fully mixed using a blender and also fully kneaded at 150° C. using a kneader. The resultant mixed-and-kneaded material was shaped into pellets each having a size of 3 to 5 m/m, which were then injection-molded into a plate-like product measuring 20 mm×80 mm×7 mm under an injection temperature of 150° C., injection pressure of 1 t/cm$^2$ and mold temperature of 35° C.

Thereafter, the molded product was gradually heated at a temperature increase rate of 20° C./hr in the range from room temperature to 150° C., at 3.6° C./hr in the range from 150° to 200° C., at 7.0° C./hr in the range from 200° to 300° C., and at 12.5° C./hr in the range from 300° to 375° C. The molded product thus obtained was free of any defect such as a cracks, swelling, deformation, etc.

The molded product was then subjected to sintering (main sintering) at a temperature increase rate of 300° C./hr. The surface of the product was completely free of any cracks, etc.

EXAMPLE 2

Manufacture of the Mixture (I)

| Glass (cullet) | 50 wt. % |
|---|---|
| Aluminum oxide | 20 |
| Clay | 10 |
| Binder | 10 |
| Primary aluminum phosphate | 2 |
| Sodium tetrapolyphosphate | 10 |
| Coloring agent (mixture of aluminum oxide and cobalt oxide in ratio of 1:4) | 3 |

The above individual components were fully mixed with one another under agitation, and the mixture (I) was obtained.

Manufacture of the Composition of This Invention

| Mixture (I) | 100 wt. parts |
|---|---|
| Polystyrene | 10 |
| Butyral resin (butyralation degree of 68 mol %) | 3.6 |
| Vegetable wax | 2.4 |
| D.O.P. | 2.4 |

Thereafter, the product was obtained in accordance with the same method as that in Example 1.

EXAMPLE 3

Manufacture of the Mixture (I)

| Glass (cullet) | 42 wt. % |
|---|---|
| Aluminum oxide | 28 |

-continued

| Clay | 12 |
|---|---|
| Binder | |
| Primary aluminum phosphate | 2 |
| Sodium tetrapolyphosphate | 4 |
| Coloring agent (Chromium oxide) | 3 |

The above individual components were fully mixed with one another, and the mixture (I) was obtained.

Manufacture of the Composition of This Invention

| Mixture (I) | 100 wt. parts |
|---|---|
| Polypropylene | 9 |
| Butyral resin | 5.1 |
| Paraffin wax | 3.0 |
| D.O.P. | 2.4 |

Thereafter, the product was obtained in accordance with the same treatment processes as those in the Example 1.

EXAMPLE 4

| Mixture (I) | 100 wt. parts |
|---|---|
| Polystyrene | 8.5 |
| Butyral resin | 3.6 |
| Stearic acid | 3.6 |

Where the mixture (I) used herein was the same as that in the Example 1.

The product was obtained from the above individual components in accordance with the same processes as those in Example 1.

The products obtained in the foregoing Examples 2 to 4 were free of any deformation, cracks, etc. and had very superior quality.

Comparison 1

| Mixture (I) | 100 wt. parts |
|---|---|
| Styrol resin | 6 |
| Butyral resin | 13 |
| Stearic acid | 3.6 |
| D.B.P. | 2.4 |

Where the mixture (I) used herein was the same as that in the Example 1.

The above composition was treated in accordance with the same processes as those in the Example 1. As a result, it was found that there occurred thermal deformation in the process of resin removal and that swells occurred in the interior of the product.

Comparison 2

| Mixture | 100 wt. parts |
|---|---|
| Styrol resin | 22 |
| Butyral resin | 3.4 |
| Stearic acid | 1.5 |
| D.B.P. | 1.5 |

Where the mixture (1) used herein was the same as that in the Example 2.

The above composition was treated in accordance with the same processes as those in the Example 1. As a result, cracks occurred in the process of resin removal.

A study showed that a resin removal time of longer than 85 hours is required to obtain the good product in this case.

EXAMPLE 5

Manufacture of the Composition of This Invention

The following components were mixed with the mixture (I) obtained in the Example 1 in the respective specific ratio as shown below:

| Mixture | 100 wt. parts |
|---|---|
| Polystyrene resin | 7.2 |
| Butyral resin | 3.6 |
| (butyralation degree of 60 mol %) | |
| Poly-n-butylmethacrylate | 3.6 |
| (Sample B35 made by Sekisui Chemical Co., Ltd., molecular weight = 147,000) | |
| Stearic acid | 3.6 |
| D.B.P. | 2.4 |

Thereafter, a plate-like product measuring 20 mm×80 mm×7 mm was obtained in a similar manner to that of the Example 1.

This molded product was then gradually heated at a temperature increasing rate of 65° C./hr in the range from room temperature to 90° C., at 8.5° C./hr in the range from 90° to 150° C., at 5.5° C./hr in a range from 150° to 220° C., at 9.5° C./hr in a range from 220° to 270° C., and at 20.0° C./hr in a range from 270° to 400° C. The resultant molded product was free of any defect such as a cracks, swells, deformation, etc.

After that, the molded product thus heated was subjected to sintering (main sintering) at a temperature increase rate of 300° C./hr up to 700° C. The surface of the obtained product was completely free of any cracks, etc.

EXAMPLE 6

| Mixture (I) | 100 wt. parts |
|---|---|
| (the same as that in Example 1) | |
| Polystyrene | 7.2 |
| Butyral resin | 2.4 |
| (the same as that in Example 1) | |
| Poly-methylmethacrylate | 3.6 |
| (Dianol BR-107 made by Mitsubishi Rayon Company Ltd., molecular weight = 75,000) | |
| Stearic acid | 4.8 |
| D.B.P. | 2.4 |

Thereafter, the product was obtained in accordance with the same method as in the Example 5.

EXAMPLE 7

Manufacture of the Composition of This Invention

| Mixture (I) | 100 wt. parts |
|---|---|
| (the same as that in Example 3) | |
| Polypropylene | 4.8 |
| Butyral resin | 3.6 |
| (the same as that in Example 1) | |
| Poly-n-butylmethacrylate | 3.6 |
| (the same as that in Example 1) | |
| Stearic acid | 4.8 |
| D.E.P. | 1.2 |

Thereafter, the product was obtained in accordance with the same processes as those in the Example 5.

EXAMPLE 8

Manufacture of the Composition of This Invention

| | |
|---|---|
| Mixture (I) (the same as that in Example 2) | 100 wt. parts |
| Polyethylene | 9.6 |
| Butyral resin (butyralation degree of 68 mol %) | 2.4 |
| Poly-methylmethacrylate (Dinal BR-105 made by Mitsubishi Rayon Company Ltd., molecular weight = about 57,000) | 2.4 |
| Stearic acid | 3.6 |
| D.O.P. | 1.2 |

Thereafter, the product was obtained in accordance with the same method as that in the Example 5.

The products obtained in the foregoing Examples 6 to 8 were free of any deformation, cracks, etc. and had very superior quality. It will be also apparent that the Examples 5 to 8 using an acrylic resin can provide still better molded products with a shorter resin removal time than the Examples 1 to 4 using no acrylic resin.

What is claimed is:

1. A composition suitable for forming a low-temperature sintered porcelain, which comprises:

at least one thermoplastic resin selected from the group consisting of polystyrene, polyethylene and polypropylene . . . ca. 6-20 wt. parts;
   butyral resin . . . ca. 1-11 wt. parts; and
   lubricant . . . ca. 1-6 wt. parts;

mixed with 100 wt. parts of a mixture having the following composition:

vitreous component . . . ca. 40-60 wt. %;
   aluminum oxide . . . ca. 10-30 wt. %;
   clay component . . . ca. 10-25 wt. %; and
   binder . . . ca. 5-15 wt. %.

2. A composition according to claim 1, wherein said butyral resin has a butyralation degree of 58 to 75 mol %.

3. A composition according to claim 1, wherein said lubricant is stearic acid.

4. A composition suitable for forming a low temperature sintered porcelain, which comprises:

(a) at least one thermoplastic resin selected from the group consisting of polystyrene, polyethylene and polypropylene . . . ca. 3-15 wt. parts;
   (b) butyral resin . . . ca. 1-8 wt. parts;
   (c) lubricant . . . ca. 1-6 wt. parts;
   (d) acrylic resin . . . ca. 1-8 wt. parts; and
   (e) plasticizer . . . ca. 1-5 wt. parts;

mixed with 100 wt. parts of a mixture having the following composition:

(f) vitreous component . . . ca. 40-60 wt. %;
   (g) aluminum oxide . . . ca. 10-30 wt. %;
   (h) clay component . . . ca. 10-25 wt. %; and
   (i) binder . . . ca. 5-15 wt. %.

5. A composition according to claim 1 wherein said mixture further contains a coloring agent at not more than about 5 wt. %.

6. A composition according to claim 1, which includes ca. 1-6 wt. parts of a plasticizer per 100 wt. parts of said mixture.

* * * * *